United States Patent [19]

Müller

[11] Patent Number: 4,890,506
[45] Date of Patent: Jan. 2, 1990

[54] LOCKING HAND LEVER FOR OPERATING A VALVE OR THE LIKE

[76] Inventor: Fritz Müller, Neuer Wasen 6, 7118 Ingelfingen-Criesbach, Fed. Rep. of Germany

[21] Appl. No.: 170,554

[22] Filed: Mar. 18, 1988

[30] Foreign Application Priority Data

Apr. 1, 1987 [DE] Fed. Rep. of Germany ....... 3710982

[51] Int. Cl.$^4$ .......................... G05G 1/04; F16K 35/00
[52] U.S. Cl. ....................................... 74/523; 74/543; 74/545; 70/175; 251/95; 251/102
[58] Field of Search ................ 74/543, 545, 546, 523, 74/537, 538, 536; 70/176, 175, 210, 201; 351/95, 96, 101, 102, 106

[56] References Cited

U.S. PATENT DOCUMENTS

| | | | |
|---|---|---|---|
| 1,313,253 | 8/1919 | Brown | 74/538 |
| 3,311,128 | 3/1967 | Taylor | 251/98 |
| 4,109,673 | 8/1978 | Horowitz | 251/96 |
| 4,193,320 | 3/1980 | Oota | 251/95 |
| 4,471,801 | 9/1984 | Lange | 70/176 |

FOREIGN PATENT DOCUMENTS

| | | | |
|---|---|---|---|
| 2416395 | 10/1974 | Fed. Rep. of Germany | 251/96 |
| 3235320 | 3/1984 | Fed. Rep. of Germany | 70/175 |
| 4460 | of 1905 | United Kingdom | 251/96 |
| 2032579 | 5/1980 | United Kingdom | 251/99 |

Primary Examiner—Gary L. Smith
Assistant Examiner—Flemming Saether
Attorney, Agent, or Firm—Henry M. Feiereisen

[57] ABSTRACT

A hand lever in particular for actuating a butterfly valve or the like in pipelines includes an outer lever portion which encases an inner lever portion and is movable in longitudinal direction thereof relative to the latter. At its forward end, the inner lever portion is fixedly connected with an element, such as an operating shaft which is operatively connected to the valve. The outer lever portion is provided with projections which are engagable in a stationary toothed wheel supported by the shaft. The movement of the outer lever portion for engaging in or disengaging the projection from the toothed wheel is obtained by a control grip which is swingably mounted to the inner lever portion and acts on the outer lever portion via a nose.

20 Claims, 1 Drawing Sheet

LOCKING HAND LEVER FOR OPERATING A VALVE OR THE LIKE

BACKGROUND OF THE INVENTION

The present invention refers to a hand lever, in particular to a hand lever for actuating a butterfly valve or the like in pipelines.

Hand levers of this type are provided with an actuating device by which a locking device can be brought into engagement or disengagement for arresting the hand lever in predetermined positions. In general, the locking device is arranged with the associated actuating device separated from the actual hand lever at a suitable location thereof. The actuating device thus projects beyond the hand lever so that an operator make risk injuries as pieces of clothing may get stuck in the projecting actuating device or a finger may get jammed between the hand lever and the actuating device during operation. Further, hand levers of this type are inconvenient to operate as the operator has to use one hand for operating the actuating device while using the other hand for gripping the hand lever to rotate the latter into the desired position. Such operation is not only inconvenient but also complicated and may result in undesired maloperations.

SUMMARY OF THE INVENTION

It is thus an object of the present invention to provide an improved hand lever obviating the afore-stated drawbacks.

This object and others which will become apparent hereinafter are attained in accordance with the present invention by providing an inner lever portion with one end adapted to be fixedly connected to an element to be actuated and an outer lever portion which is movable relative to said inner lever portion in longitudinal direction thereof and includes at its end facing the element a locking member which is engagable in or disengagable from the element by an actuating unit cooperating with the outer lever portion.

The hand lever according to the present invention does not require a linkage of bars in order to transmit the actuating motion to the locking device and thus is of simple design and yet allows reliable operation without any danger of injury. The outer lever portion transmits the actuating motion and allows through its axial movement an engagement or disengagement of the locking member. Thus, the locking device is integrated within the hand lever and the presence of projecting parts is prevented which otherwise may result in injuries. By incorporating the locking device and the actuating device in the hand lever, the latter can be actuated with one hand by embracing the outer lever portion and simultaneously grasping with the fingers the actuating device so that the locking member may be disengaged and then the hand lever be turned into the desired position. The release and engagement of the locking member as well as the turning of the hand lever can thus be carried out by one hand without withdrawing the latter from the hand lever thus greatly increasing the operating convenience.

According to another feature of the present invention, the actuating device includes a control grip which is swingably mounted to the inner lever portion about a pivot point and includes an integrated nose which cooperates with the outer lever portion to move the latter in longitudinal direction when actuating the control grip. By integrating the control grip in this manner within the hand lever, a jamming of the finger and thus possible injuries are prevented while operating the control grip. The control grip may be provided with a surface which is ergonomically designed with a successive arrangement of wave crests and wave troughs and is of sufficient length to allow the fingers to apply a force in comfortable manner without getting cramps. The nose is preferably spaced from the pivot point so as to attain an increase of force and simultaneously, to displace the outer lever portion relative to the inner lever portion directly upon actuating the control grip so as to disengage the locking member.

The control grip is preferably spring-loaded toward the locking position of the locking member by a suitable helical spring which bears with one end against the inner lever portion and is supported at its other end by the control grip. The support of the inner lever portion and the helical spring are thus protected against dirt from outside so that a reliable operation is ensured over an extended period.

The control grip is preferably arranged at the free end and at the underside of the hand lever to allow the operator to reach the control grip easily and comfortably. The free end of the control grip is preferably directed toward the element which may be an operating shaft connected to a butterfly valve. During actuation of the hand lever, the hand can embrace the outer lever portion whereby its index finger and middle finger can simultaneously pull the control grip toward the inner lever portion. There is no danger of jamming the finger because the underside of the outer lever portion includes only an opening through which the control grip may project but otherwise the outer lever portion encases the inner lever portion so that the hand will rest safely on the outer lever portion.

The locking device may be defined by at least two projections which are arranged at the forward end of the outer lever portion and cooperate with complementary recesses of a stationary locking element. Thus, the projections are engaged into successive recesses of the locking element in order to fix the hand lever. In this manner, wear of cooperating parts can be greatly reduced and a safe locking engagement is attained even if one of the projections breaks off so that the life of the locking device is greatly increased.

Preferably, the stationary locking element includes a toothed ring having an external toothing and extending at least over a part of a circumference of the locking element. The projections at the facing end of the outer lever portion are defined by complementary teeth which are selectively engagable in the external toothing. A locking via a meshing tooth system of this type allows accurate positioning of the hand lever. Preferably, the hand lever may be fixed by the locking device at an angular pitch or angular steps of about 16°.

According to another feature of the invention, the forward portion of the hand lever including the locking device and the connection between the inner lever portion and the element to be actuated is covered by a protecting cap so that a penetration of dust or dirt is avoided. In addition, the hand lever is given an aesthetic and pleasing outer appearance. Preferably, the protecting cover is made of plastic material.

Advantageously, the hand lever in accordance with the invention may be provided with an indicating device in order to allow the operator to determine the position of the locking device, i.e. whether the latter is in engagement or disengagement. Accordingly, the protecting cap is provided with an opening in the area of the outer lever portion which includes display elements respectively visible through the opening in dependence on the position of the locking device. Suitably, the opening accommodates a magnifying lens. As display elements color indicators may be used like red and green markings arranged on the outer surface of the outer lever portion. The indicating device is thus integrated in the hand lever and no additional inscriptions or the like are necessary.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
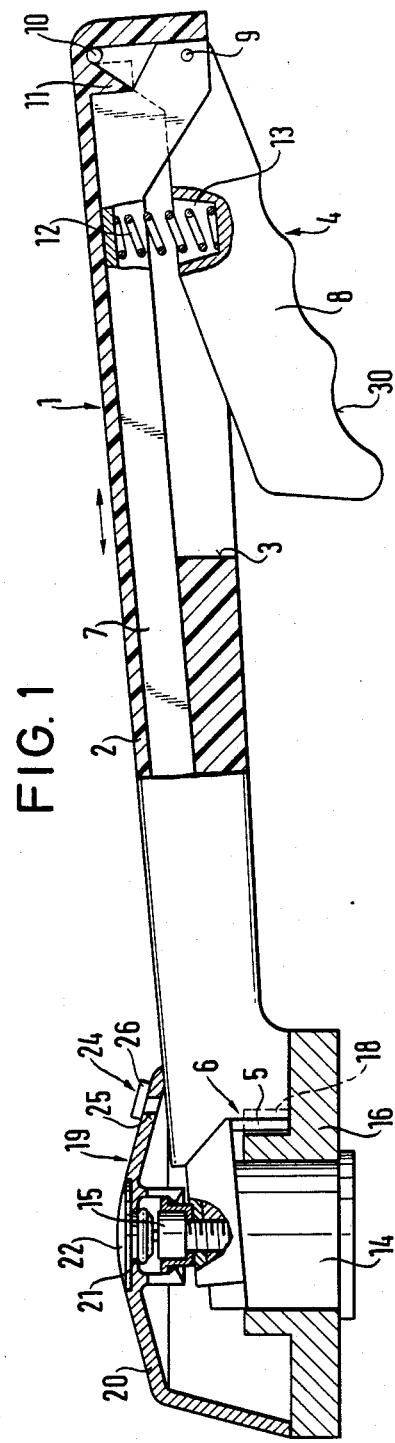
FIG. 1 is a longitudinal partial cross sectional view of one embodiment of a hand lever in accordance with the invention.

Referring now to the drawing, there is shown one embodiment of a hand lever in accordance with the invention generally designated by reference numeral 1 and provided for actuating an element such as a butterfly valve (not shown) or the like in pipelines. The hand lever 1 includes an outer lever portion 2 which is preferably made of plastic material and is essentially designed in form of a closed housing. Arranged at the underside of its rear section, the outer lever portion 2 is provided with an opening 3 which receives an actuating unit generally designated by reference numeral 4 and described in more detail further below. At its axial forward end, the outer lever portion 2 is provided with two projections or teeth 5 (FIG. 2) which define the movable locking element of a locking unit generally designated by reference numeral 6.

The outer lever portion 2 encases a stationary inner lever portion 7 which is preferably made of metal and is of U-shaped cross section. Operatively connected to the inner lever portion 7 is the actuating device 4 which includes a control grip 8 with ergonomically designed surface 30 for allowing tight and yet comfortable grasping by the hand of the operator. In the nonlimiting example of FIG. 1, the grip surface 30 is defined by a successive arrangement of wave crests and wave troughs which are of such dimension so as to be grasped comfortably by an operator.

When the hand lever is in the locking position as illustrated in FIG. 1, the control grip 8 slightly projects outwardly from the opening 3 at the underside of the hand lever 1, with its free end pointing in direction of the butterfly valve. At its rearward end, the control grip 8 is swingably mounted to the inner lever portion 7 about pivot point 9 and includes at a distance to the pivot point 9 a nose 10 which bears against the outer lever portion 2. Cooperating with the nose 10 is a rib or projection 11 which is an integral part of the outer lever portion 2 and faces inwardly so that the nose 10 engages directly into the intermediate space between the projection 11 and the rear end of the outer lever portion 2. The control grip 8 is thus directly connected free of play with the outer lever portion 2 so that an actuation of the control grip 8 will cause an axial movement of the outer lever portion 2.

Figure 2:
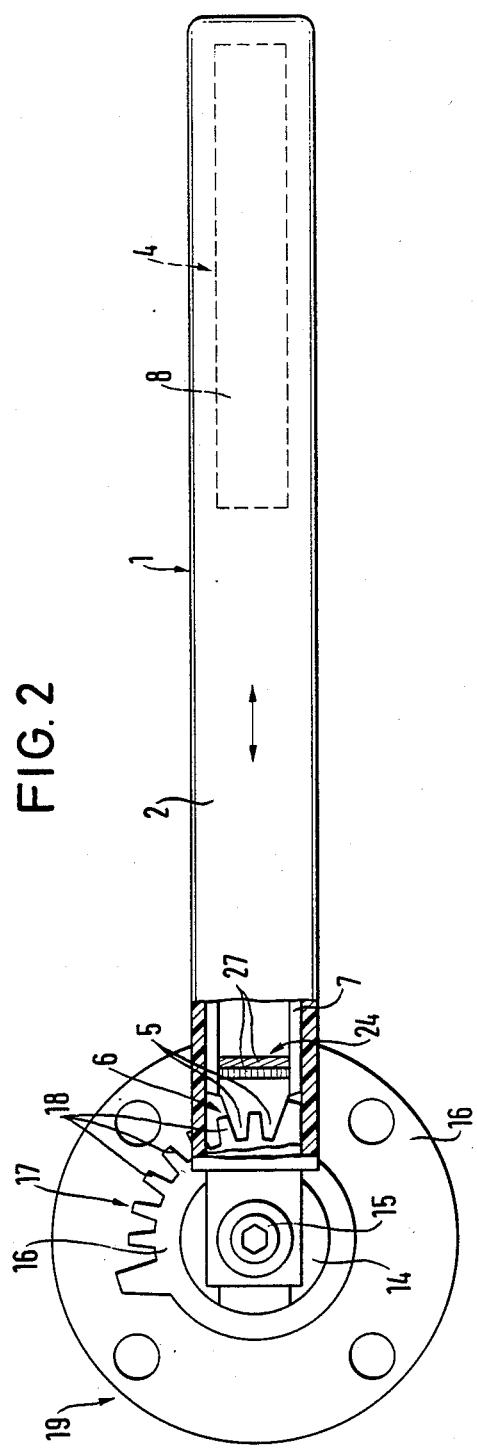
FIG. 2 is a partly sectional top view of the hand lever of FIG. 1 for illustration of a locking mechanism.

A compression spring such as a cylindrical helical spring 12 is arranged axially inwardly at a distance from the rear end of the hand lever 1 and bears with its one end against the inner surface of the inner lever portion 7 while its other end is supported in a recess 13 of the control grip 8 (FIG. 2). The compression spring 12 is thus located in a protective manner within the interior of the outer lever portion 2 and exerts a constant force onto the control grip 8 to continuously bias the latter in locking position as shown in FIG. 1.

In the nonlimiting example of FIG. 1, the hand lever 1 is provided to actuate e.g. a butterfly valve which may be located in pipelines or the like. An operating shaft 14 is suitably connected to the butterfly valve so as to transmit a turning motion of the hand lever 1 to the butterfly valve for repositioning the latter. The forward end of the stationary inner lever portion 7 is fixedly connected to the operating shaft 14 by means of a suitable fastener like a screw 15 which as shown in FIG. 1 traverses the inner lever portion 7 and is threadably engaged in the operating shaft 14.

Supported by the shaft 14 is a stationary element 16 which is part of the locking device 6 and is secured by the screw 15 via the connection between the inner lever portion 7 and the operating shaft 14. The stationary element 16 includes a toothed ring 17 with outwardly projecting teeth 18. The toothed ring 17 extends about an angular area of about 100° and has outer teeth of greater tooth depth than the others so as to prevent the projections or teeth 5 of the outer lever portion 2 from overrunning the end positions. Suitably, the teeth 18 of the toothed ring 17 are spaced from each other in such a manner that the hand lever 1 is fixed at an angular pitch or angular steps of about 16°, respectively.

In locking position of the locking unit 6, the teeth 5 at the outer lever portion 2 engage in the spaces between adjacent teeth 18 of the toothed ring 17 so as to embrace a respective one of the teeth 18 and to ensure a fixation of the hand lever 1 in a desired position.

As can be seen especially from FIG. 1, the front portion of the hand lever 1 generally designated by reference numeral 19 includes a protecting cap 20 which is placed on the stationary element 16 and encloses the locking device 6 and the connection of the inner lever portion 7 with the operating shaft 14. In the area of the screw 15, the protecting cap 20 is provided with an opening 21 in which a closing element 22 is insertable and e.g. threadably engaged with the screw 15. By loosening the closing element 22, the screw 15 becomes accessible with a tool from outside so that possible maintenance or repair work of the locking device 6 may be performed after removing the protecting cap 20.

In order to inform the user about the position of the locking device 6, the protective cap 20 is provided at a suitable location thereof with a slot 25 in which e.g. a magnifying lens 26 is inserted. The outer lever portion 2 is provided with markings 27 which are aligned with the slot 25 and respectively indicate the locking position or the release position of the locking device 6. The markings 27 may be of any suitable type and may be defined for example by adjoining color strips which are arranged on the outer lever portion 2 and are clearly visible through a window as defined by the slot 25 and the magnifying lens 26. Suitably, the locking position may be displayed by a red color strip while the release position is indicated by a green color strip.

After having described the individual parts of the embodiment of a hand lever according to the invention, its mode of operation will now be described in more detail.

FIGS. 1 and 2 show the hand lever 1 in the locking position in which the teeth 5 of the outer lever portion 2 engage two adjoining spaces between respective teeth 18 of the toothed ring 17 so that the hand lever 1 cannot be turned. In the locking position of the hand lever 1, the indicating unit 24 will display the color "red" and the control grip 8 projects slightly out of the opening 3 at the lower side of the outer lever portion 2. The nose 10 of the grip 8 bears at the outer lever portion 2.

In the event, it is desired to adjust the butterfly valve via the operating shaft 14, the operator will grasp with one hand the outer lever portion 2 of the hand lever 1, with the index finger and the middle finger suitably gripping the ergonomically designed surface 30. The grip 8 is then pulled inwardly toward the outer lever portion 2 in opposition to the force exerted by the compression spring 12 so that the nose 10 is moved rearwards. In view of the interrelationship between the nose 10 and the outer lever portion 2, the latter is thus displaced rearwards relative to the inner lever portion 7 by the nose 10 by a small distance which is sufficient to disengage the teeth 5 from the teeth 18 of the locking device 6. The hand lever 1 can now be turned into the desired position at still depressed position of the grip 8, and with the indicating device 24 displaying a green marking 27. When reaching the desired position, the operator releases the control grip 8 so that the latter is urged by the compression spring 12 into the position as shown in FIG. 1 while the outer lever portion 2 is returned by the nose 10 into the locking position in which the teeth 5 of engage between respective teeth 5 the toothed ring 17 so as to lock the hand lever 1 in its new position as now indicated again by the red marking 27. The movement of the outer lever portion 2 relative to the inner lever portion 2 in axial direction is indicated in FIG. 1 by the double arrow.

As will be readily recognized, the hand lever 1 can certainly be used for actuation of devices other than a butterfly valve as applied in the present nonlimiting example.

The stationary inner lever portion 7 is preferably made of metal so as to allow the movable outer lever portion 2 to be made of a thin walled plastic material and to serve as reinforcement of the outer lever portion 2 and thus of the hand lever 1. A combination of such an outer lever portion of plastic material encasing an inner lever portion of metal results in a compound construction which has sufficient stiffness and rigidity despite the use of thin walled parts, and a compact hand lever is achieved which allows comfortable operation.

While the invention has been illustrated and described as embodied in a Hand Lever, it is not intended to be limited to the details shown since various modifications and structural changes may be made without departing in any way from the spirit of the present invention.

What is claimed as new and desired to be protected by Letters Patent is set forth in the appended claims:

1. A hand lever for actuating an element such as a butterfly valve or the like; comprising
   an inner lever portion having one end adapted to be fixedly connected to the element;
   an outer lever portion being movable relative to said inner lever portino and having one end facing the element;
   locking means arranged at said one end of said outer lever portion for selectively engaging said outer lever portion with the element; and
   actuating means separate from and connected to said outer lever for moving said outer lever portion in longitudinal direction thereof relative to said inner lever portion for allowing engagement and disengagement of said outer lever portion.

2. A hand lever as defined in claim 1 wherein said actuating means includes a control grip having one end operatively connected with said outer lever portion at the other end thereof distant to said locking means for moving said outer lever portion in longitudinal direction.

3. A hand lever as defined in claim 2 wherein said control grip is swingably mounted to said inner lever portion about a pivot point at said other end of said outer lever, and further comprising spring means for biasing said control grip so that said outer lever portion is in locking position.

4. A hand lever as defined in claim 3 wherein said control grip has a nose arranged at a distance to said pivot point and operatively connected to said outer lever portion.

5. A hand lever as defined in claim 2 wherein said control grip is arranged at the underside of said outer lever portion and has a free end directed toward the element.

6. A hand lever as defined in claim 2 wherein said control grip is movable in direction toward said inner lever portion for disengaging said locking means.

7. A hand lever as defined in claim 3 wherein said spring means includes a helical spring having one end bearing against said inner lever portion and another end supported by said control grip.

8. A hand lever as defined in claim 2 wherein said control grip is provided with an ergonomically designed surface.

9. A hand lever as defined in claim 1 wherein said locking means includes a stationary locking element supported by the element and at least two projections arranged at said outer lever portion for engaging complementary recesses in said stationary locking element.

10. A hand lever as defined in claim 9 wherein said stationary locking element includes a toothed ring extending at least about a part of the circumference of said locking element, said projections being teeth engagable in said toothed ring.

11. A hand lever as defined in claim 1 wherein said outer lever portion is locked by said locking means at angular steps of about 16°, respectively.

12. A hand lever as defined in claim 1, and further comprising a protecting cap enclosing said locking means, the element and the connection between said inner lever portion with the element.

13. A hand lever as defined in claim 1, and further comprising indicating means cooperating with said outer lever portion for displaying the engaging position and disengaging position of said outer lever portion.

14. A hand lever as defined in claim 13, and further comprising a protecting cap enclosing said locking means, the element and the connection between said inner lever portion with the element and having an opening, said indicating means including display elements arranged on said outer lever portion in correspondence with the engagement or disengagement of said outer lever portion.

15. A hand lever as defined in claim 14 wherein said indicating means further includes a lens inserted in said opening.

16. A hand lever as defined in claim 14 wherein said display elements are defined by color markings.

17. A hand lever as defined in claim 1 wherein said inner lever portion is of U-shaped cross section.

18. A hand lever as defined in claim 1 wherein said outer lever portion encases said inner lever portion.

19. A hand lever as defined in claim 1 wherein said outer lever portion is made of plastic material.

20. A hand lever as defined in claim 1 wherein said inner lever portion is made of metal.

* * * * *